Feb. 7, 1967 G. S. DES BRISAY, JR 3,303,359

LINEAR RAMP GENERATOR

Filed July 31, 1964 2 Sheets-Sheet 1

INVENTOR
GEORGE S. DES BRISAY JR.,
BY
Paul M. Coble
ATTORNEY.

Feb. 7, 1967 G. S. DES BRISAY, JR 3,303,359

LINEAR RAMP GENERATOR

Filed July 31, 1964 2 Sheets-Sheet 2

INVENTOR.
GEORGE S. DES BRISAY JR.,
BY
Paul M. Coble
ATTORNEY.

United States Patent Office 3,303,359

Patented Feb. 7, 1967

3,303,359
LINEAR RAMP GENERATOR

George S. Des Brisay, Jr., Manhattan Beach, Calif., assignor to Hughes Aircraft Company, Culver City, Calif., a corporation of Delaware Filed July 31, 1964, Ser. No. 386,515
12 Claims. (Cl. 307—88.5)

This invention relates to waveform generation, and more particularly relates to a circuit for generating a precision ramp voltage of high linearity and high stability.

Ramp generators find wide application in numerous electronic systems such as radar range display and tracking circuitry, pulse delay circuitry, time base circuitry for analog-to-digital converters, and voltage-controlled oscillators. In these and other applications it is necessary that the generated ramp waveform possess certain desirable characteristics including linearity, temperature stability, fast recovery and accurate baseline referencing.

Accordingly, it is an object of the present invention to provide a precision ramp generator for generating a ramp waveform of extremely high linearity.

It is a further object of the present invention to provide a precision ramp generator which enables the generated ramp voltage to rapidly recover to an accurately controlled baseline, or reference, level thereby allowing operation with a high duty cycle.

It is a still further object of the present invention to provide a precision ramp generator which affords excellent temperature stability of waveform linearity, slope and initial offset, as well as of the baseline reference level.

It is still another object of the present invention to provide a precision ramp generator having a low output impedance in order to minimize the effect of load variations on the generated waveform.

In accordance with the objects set forth above, the ramp generator of the present invention includes a differential amplifier having its output coupled to a signal processing network having a voltage gain of essentially unity. An integrating capacitor has a first electrode coupled to the input terminal of the differential amplifier and a second electrode coupled to the output terminal of the signal processing network, with a constant current supplying network coupled to the first capacitor electrode. A ramp control switch is coupled to the first and second capacitor electrodes to maintain an essentially constant charge on the capacitor in the absence of a control signal, and in response to a control signal to allow the current supply network to charge the capacitor linearly at a predetermined rate so that a ramp voltage is provided at the output terminal of the signal processing network, and upon termination of the control signal to discharge the capacitor at a rate substantially faster than the predetermined rate so that the ramp voltage is terminated.

The control signal for the ramp control switch may be furnished by a bistable multivibrator which is triggered from a first to a second stable state in response to an input pulse. The control signal is terminated when the bistable multivibrator is reset to its first stable state in response to a signal from a comparator circuit which is activated when the generated ramp voltage exceeds a predetermined reference voltage. A regenerative feedback signal from the bistable multivibrator to the comparator circuit accelerates the resetting of the multivibrator upon the commencement of the termination of the control signal.

The foregoing, as well as additional objects, advantages and characteristic features of the present invention will become readily apparent from the following detailed description of a preferred embodiment of the invention when considered in conjunction with the accompanying drawings in which.

Figure 1:
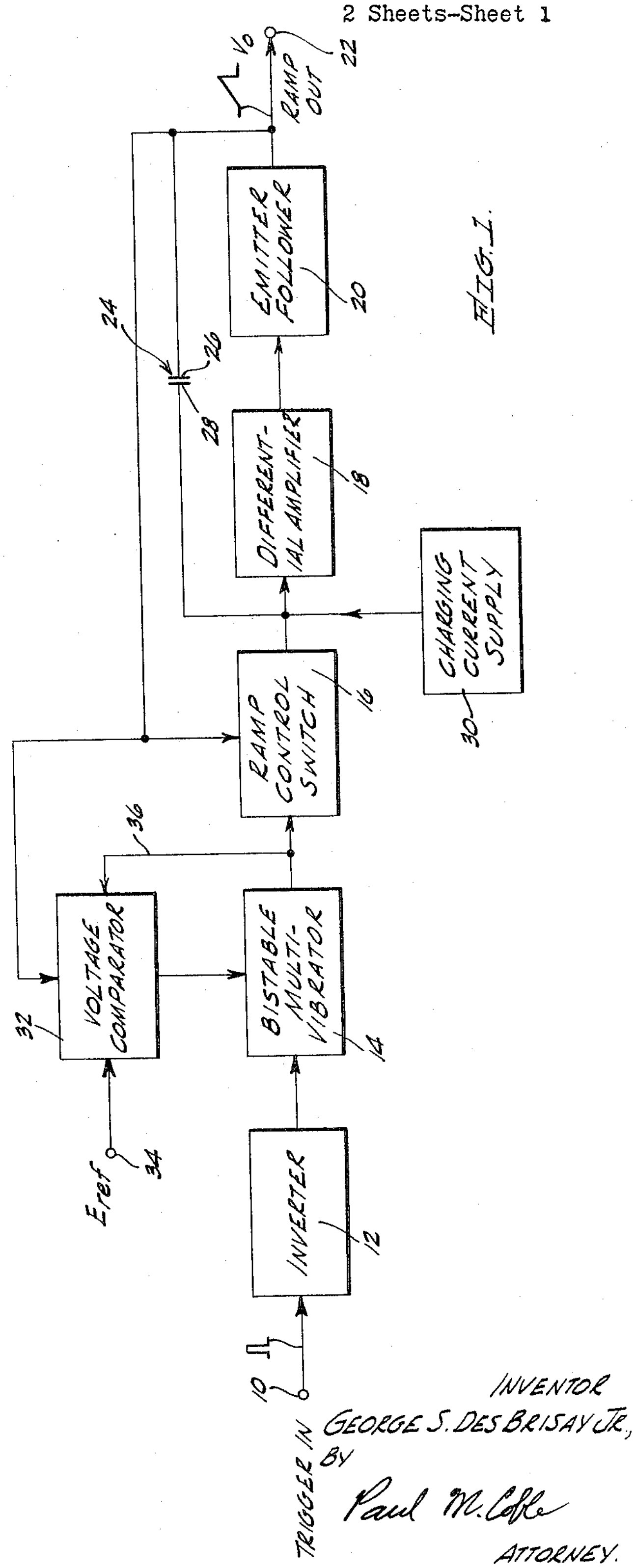
FIG. 1 is a block diagram illustrating a ramp generator in accordance with the present invention.

Referring with more particularity to FIG. 1, a ramp generator according to the present invention may be seen to include an input terminal 10 adapted to apply input trigger pulses to an inverter circuit 12. Output pulses from the inverter circuit 12 are applied to a bistable multivibrator circuit 14 in order to trigger the multivibrator 14 from its first to its second stable state. The output signal from the bistable multivibrator circuit 14 is applied to a ramp control switch 16 which controls the current at the input to a differential amplifier 18 during the generation and termination of the ramp voltage, as well as during the periods between individual ramps. The differential amplifier 18 preferably has a high A.C. voltage gain as well as both high A.C. and D.C. current gains. The output from the differential amplifier 18 is coupled through an emitter follower transistor circuit 20 to a terminal 22 at which the ramp output waveform $V_o$ is provided.

In order to generate the desired ramp waveform, an integrating capacitor 24 is coupled in feedback relationship across the differential amplifier 18 and the emitter follower transistor circuit 20. More specifically, the integrating capacitor 24 has a first electrode 26 connected to the output terminal 22 and a second electrode 28 connected to the junction between one terminal of the ramp control switch 16 and the input to the differential amplifier 18. A relatively large and essentially constant charging curernt is provided for the integrating capacitor 24 by means of charging current supply circuit 30 connected to the capacitor electrode 28.

The output terminal 22 is connected to another terminal of the ramp control switch 16, as well as to one input to a voltage comparator circuit 32 which compares the output voltage $V_o$ with a preselected reference voltage $E_{ref}$ from a reference terminal 34 and generates an output signal when the output voltage $V_o$ exceeds the reference voltage $E_{ref}$. The output signal from the voltage comparator circuit 32 is applied to the bistable multivibrator 14 to reset the multivibrator 14 to its first stable state. In order to accelerate the resetting of the bistable multivibrator circuit 14, and thereby hasten the termination of the ramp waveform, a regenerative feedback path 36 is provided between the output from the bistable multivibrator 14 and the comparator circuit 32.

Under quiescent conditions, the bistable multivibrator 14 resides in its first stable state in which no control signal is applied to the ramp control switch 16. The switch 16 then functions to maintain an essentially constant charge on the capacitor 24 so that the output voltage $V_o$ at the terminal 22 is held at a baseline level. In response to a trigger pulse applied to the input terminal 10, the bistable multivibrator 14 is triggered to its second stable state in which the multivibrator 14 applies a control signal to the ramp control switch 16. The switch 16 then allows the current supply circuit 30 to charge the capacitor 24 linearly at a predetermined rate so that a ramp voltage is provided at the output terminal 22. When the ramp voltage exceeds the reference voltage $E_{ref}$, the voltage comparator circuit 32 applies a reset signal to the bistable multivibrator 14 to reset the multivibrator 14 to its first stable state and thereby terminate the control signal applied to the ramp control switch 16. Termination of the control signal is accelerated by the regenerative signal on the feedback path 36 which accelerates the generation of the reset signal upon the commencement of the termination of the control signal. Upon termination of the control signal, the ramp control switch 16 functions to discharge the capacitor 24 at a rapid rate in order to return the output voltage $V_o$ to its baseline level.

Figure 2:
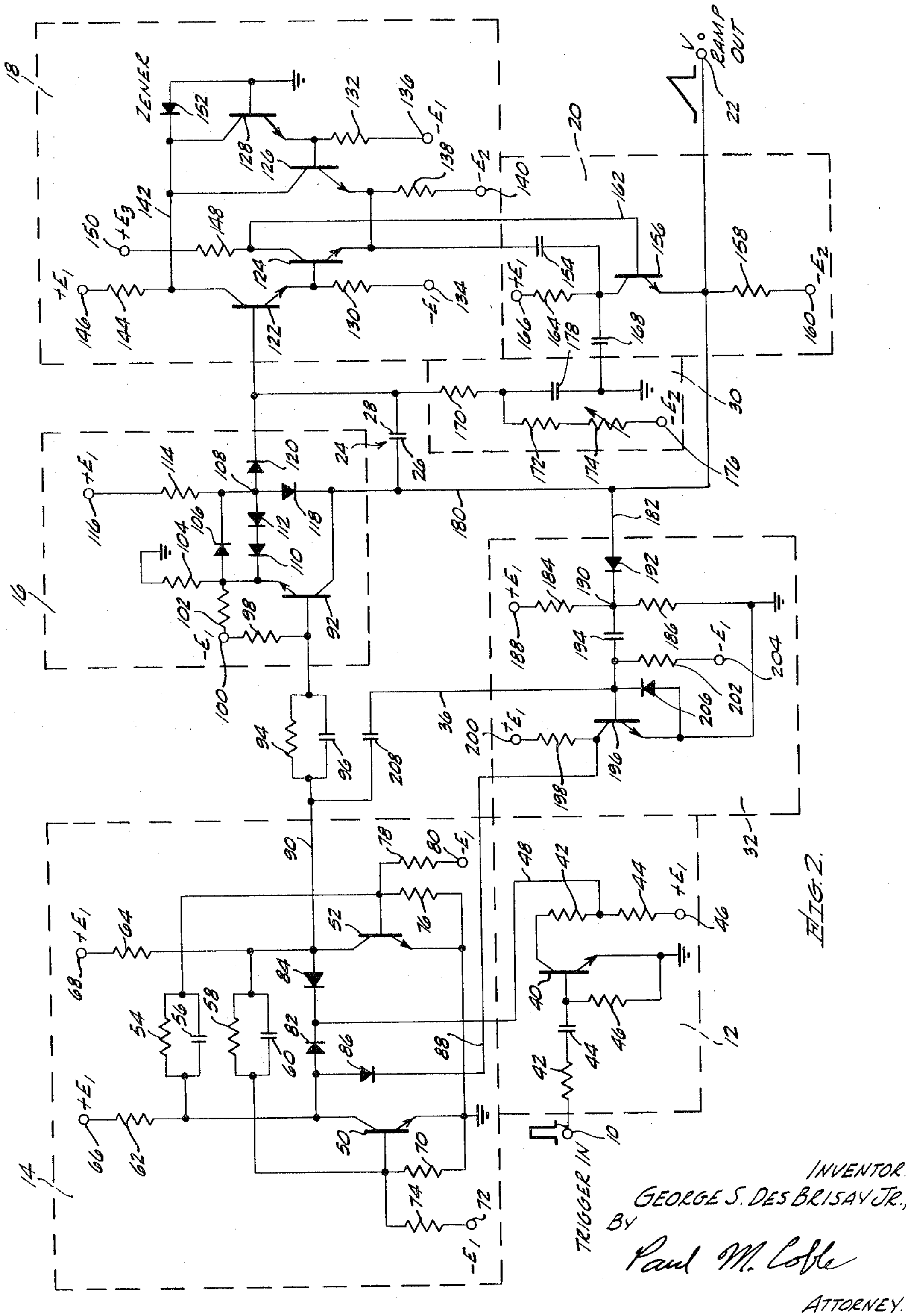
FIG. 2 is a schematic circuit diagram of the ramp generator of FIG. 1.

The ramp generator of the present invention will now be described in greater detail with reference to FIG. 2. The inverter circuit 12 comprises a transistor 40 having its emitter electrode connected to a level of reference potential designated as ground and having its collector electrode connected via series resistors 42 and 44 to a terminal 46 supplying a bias potential of $+E_1$, which may be of around +50 v. It should be understood that although the transistor 40 is illustrated as an NPN transistor and the terminal 46 is shown as providing a positive voltage, a PNP transistor is equally suitable in which case the terminal 46 would supply a negative bias voltage. The base electrode of the inverter transistor 40 is coupled to the input terminal 10 via a coupling resistor 42 and a capacitor 44 connected in series, with a bias resistor 46 being coupled between the base electrode of the transistor 40 and ground. The output pulse from the inverter circuit 12 is applied to a lead 48 connected between the junction between the collector resistors 42 and 44 and the trigger input to the bistable multivibrator 14.

The bistable multivibrator 14 includes a pair of similar transistors 50 and 52 having their emitter electrodes connected to the ground level. The collector electrode of transistor 50 is connected to the base electrode of the transistor 52 in regenerative fashion by means of a parallel resistor 54 and capacitor 56, while the collector electrode of the transistor 52 is similarly connected to the base electrode of the transistor 50 via a resistor 58 and capacitor 60 connected in parallel. The respective collector electrodes of the transistors 50 and 52 are connected by means of respective resistors 62 and 64 to bias terminals 66 and 68, respectively, each supplying a bias potential of $+E_1$. The base electrode of the transistor 50, which is grounded through a resistor 70, is connected via a resistor 74 to a terminal 72 supplying a bias potential of $-E_1$. Similarly, the base electrode of the transistor 52 is grounded through a resistor 76 and is connected via a resistor 78 to a terminal 80 supplying a bias potential of $-E_1$. First and second rectifier diodes 82 and 84 are connected in series in opposite polarity between the respective collector electrodes of the transistors 50 and 52, with the junction between the diodes 82 and 84 being connected to the lead 48 from the inverter circuit 12. A diode 86 is connected in the same polarity as the diode 82 between the collector electrode of the transistor 50 and a lead 88 to which is applied a reset signal for the bistable multivibrator 14. The output signal from the bistable multivibrator 14, which constitutes a control signal for the ramp control switch 16, is applied to a lead 90 connected to the collector electrode of the transistor 52.

The ramp control switch 16 includes a switching transistor 92 having its base electrode connected via a parallel resistor 94 and capacitor 96 to the multivibrator output lead 90. The base electrode of the transistor 92 is also connected through a bias resistor 98 to a terminal 100 supplying a bias potential of $-E_1$. A resistor 102 is connected between the bias terminal 100 and the emitter electrode of the transistor 92, while a resistor 104 interconnects the emitter electrode of the transistor 92 with ground. A rectifier diode 106 has its anode-cathode path connected between the emitter electrode of the transistor 92 and a junction point 108, while a pair of rectifier diodes 110 and 112 have their anode-cathode paths connected in series and in like polarity between the junction point 108 and the emitter electrode of the transistor 92. It should be noted that the series diodes 110 and 112 are connected in parallel with the diode 106 and in opposite polarity to that of diode 106. A resistor 114 interconnects the junction point 108 with a terminal 116 supplying a bias potential of $+E_1$. A rectifier diode 118 has its anode-cathode path connected between the junction point 108 and the electrode 26 of the integrating capacitor 24, while a similar diode 120 has its anode-cathode path connected between the junction point 108 and the electrode 28 of the capacitor 24. Preferably, the diodes 118 and 120 are planar type diodes.

The differential amplifier 18 comprises four similar transistors 122, 124, 126 and 128, preferably of the planar variety. The base electrode of the transistor 122 is connected to the junction between the electrode 28 of the integrating capacitor 24 and the cathode of the diode 120, while the base electrode of transistor 128 is grounded. The respective emitter electrodes of the transistors 122 and 128 are connected by means of respective resistors 130 and 132, to terminals 134 and 136, respectively, which supply a bias potential of $-E_1$. In addition, the respective emitter electrodes of the transistors 122 and 128 are connected to the respective base electrodes of the transistors 124 and 126, with the emitter electrodes of the transistors 124 and 126 being connected via a common resistor 138 to a terminal 140 supplying a bias voltage of $-E_2$, which may be around −250 v. The collector electrodes of the transistors 122, 126 and 128 are connected to a lead 142 which, in turn, is connected through a resistor 144 to a terminal 146 supplying a bias potential of $+E_1$. A resistor 148 interconnects the collector electrode of the transistor 124 with a terminal 150 supplying a bias potential of $+E_3$, which may be around +300 v. A zener diode 152 has its anode-cathode path connected between the base and collector electrodes of transistor 128.

The common emitter electrodes of the differential amplifier transistors 124 and 126 are coupled via a capacitor 154 to the collector electrode of an emitter follower transistor 156 in the emitter follower circuit 20. The emitter electrode of the transistor 156 is directly connected to the output terminal 22 and is also connected via a resistor 158 to a terminal 160 supplying a bias potential of $-E_2$. The base electrode of the emitter follower transistor 156 receives the output signal from the differential amplifier 18 via a lead 162 connected to the collector electrode of the transistor 124. A resistor 164 interconnects the collector electrode of the emitter follower transistor 156 with a terminal 166 supplying a voltage of $+E_1$, while a capacitor 168 couples the collector electrode of transistor 156 to ground.

The charging current supply circuit 30 includes a pair of resistors 170 and 172 and a trimmer adjustment potentiometer 174, all connected in series between the capacitor electrode 28 and a terminal 176 supplying a bias potential of $-E_2$. A capacitor 178 intercouples the junction between resistors 170 and 172 with ground. The output terminal 22 is connected via a lead 180 to the electrode 26 of the integrating capacitor 24, and is connected via a lead 182 to one input to the voltage comparator circuit 32.

In the voltage comparator 32 series resistors 184 and 186 are connected between a terminal 188 supplying a voltage of $+E_1$ and ground. The junction point 190 between the resistors 184 and 186 is connected to the cathode of a rectifier diode 192, the anode of which is connected to the lead 182. The reference voltage $E_{ref}$, which is determined by the maximum voltage to which it is desired that the ramp voltage rise, appears at the junction point 190, and by suitable selection of the magnitude of the bias potential $E_1$ and the resistance values of resistors 184 and 186 a desired reference voltage $E_{ref}$ may be afforded. The junction point 190 is coupled via a capacitor 194 to the base electrode of a transistor 196, the emitter electrode of which is grounded and the collector electrode of which is connected to the reset lead 88 for the bistable multivibrator 14. A resistor 198 interconnects the collector electrode of the transistor 196 with a terminal 200 supplying a potential of $+E_1$, while a resistor 202 interconnects the base electrode of the transistor 196 with a terminal 204 supplying a bias voltage of $-E_1$. The anode-cathode path of a diode 206 is connected between the emitter and base electrodes of the transistor 196.

As has been mentioned above, in order to accelerate resetting of the multivibrator 14, a regenerative feedback path 36 which includes a coupling capacitor 208 is provided between the output lead 90 from the multivibrator 14 and the base electrode of the comparator transistor 196.

In the following discussion of the operation of the ramp generator of FIG. 2, it will be assumed for purposes of explanation that the forward voltage drop across each conducting diode, including transistor base-emitter junctions, is 0.5 v. and that the voltage drop across the collector-emitter path of each transistor conducting in saturation is 0.2 v., it being understood that these assumptions are made solely for simplifying the discussion and are in no way to be construed as limitations. During quiescent conditions, i.e., before a trigger pulse is applied to the input terminal 10, the inverter transistor 40 is in a cut-off condition, and a voltage of essentially $+E_1$ is applied to the junction between the diodes 82 and 84 of the bistable multivibrator 14. The bistable multivibrator 14 resides in its first stable state which shall be termed the "reset" state in which the transistor 50 is conductive while the transistor 52 is cut off. In this condition a relatively high voltage resides on the multivibrator output lead 90, and the switching transistor 92 in the ramp control switch 16 is biased into a saturated conductive condition.

Figure 3:
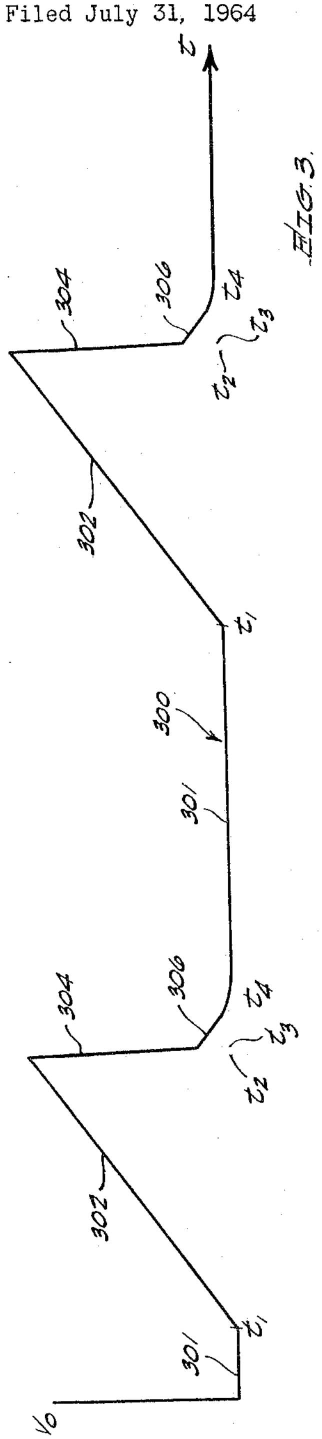
FIG. 3 is a graph of voltage vs. time illustrating the ramp output waveform provided by the circuit of the present invention.

In the quiescent state the differential amplifier 18 functions as an operational type feedback amplifier (the feedback being provided by diodes 118 and 120 of the ramp control switch 16) operating in a balanced condition in which the current flow through transistor 124 is equal to the current flow through transistor 126, the current flow through transistor 122 is equal to the current flow through transistor 128, and in which the diodes 118 and 120 are both conductive with the current flow through the diode 118 being equal to the current flow through the diode 120. It will be observed that as a result of the aforementioned equal current conditions, the net voltage drop across the diode 120 and the base-emitter junctions of transistors 122 and 124 is equal in magnitude and opposite in polarity to the net voltage drop across the diode 118 and the base-emitter junctions of the transistors 128 and 126, thereby applying ground potential to the output terminal 22. Thus, during this time the output voltage $V_o$ resides at its baseline, or reference, level of zero volts, as shown by the portion 301 of the waveform 300 of FIG. 3. Moreover, since equal voltage drops exist across the diodes 118 and 120, the integrating capacitor 24 resides in a discharged condition. It should be noted that at this time the current flowing through the resistor 114 divides in half at the junction point 108, with half the current flowing through the diode 118 and essentially the other half flowing through the diode 120 and the resistor 170 (the base current of the transistor 122 being negligible compared to the current through the diode 120).

Since the diode 118 is conductive, a potential of around 0.5 v. is applied to the junction point 108, and since the switching transistor 92 is saturated its emitter electrode resides at a potential of around −0.2 v. This condition provides a back bias of approximately 0.7 v. across the diode 106, cutting off the diode 106. Although a forward bias of around 0.7 v. exists across the pair of series diodes 112 and 110, the individual bias across each of these diodes is insufficient to cause any appreciable current to flow through their anode-cathode paths, and for all practical purposes the diodes 110 and 112 are in cut-off condition.

At time $t_1$ a positive trigger pulse is applied to the input terminal 10 in order to initiate the generation of the ramp waveform. The inverter transistor 40 is thus rendered conductive, applying a decreased potential via the lead 48 to the cathodes of the diodes 82 and 84 in the bistable multivibrator 14. This decreasing potential passes through the diode 84 to the collector electrode of the transistor 52 and through the coupling resistor 58 and capacitor 60 to the base electrode of transistor 50, causing the transistor 50 to cut off and rendering the transistor 52 conductive in accordance with well-known multivibrator action. The multivibrator 14 is thus placed in its second, or "triggered," state in which a relatively low voltage appears on its output lead 90.

The resultant negatively changing step voltage on the lead 90 constitutes a control signal for the switch 16 and is applied to the base electrode of the transistor 92, causing the transistor 92 to cut off. Current flow through the resistor 102 then decreases, causing the potential at the emitter electrode of the transistor 92 to decrease. This places a greater forward bias across the series diodes 112 and 110, causing these diodes to become conductive. Current then flows from the positive terminal 116 through the resistor 114, through the diodes 112 and 110 and through the resistor 102 to the negative terminal 100, as well as from ground through the resistors 104 and 102 to the terminal 100. The resistance values of resistors 102, 104 and 114 and the bias potentials $\pm E_1$ are selected such that the voltage at the emitter electrode of the switching transistor 92 is around −2 v. at this time. On account of the forward voltage drops across the diodes 112 and 110 the junction point 108 assumes a potential of around −1 v., placing a reverse bias across the diodes 118 and 120 which results in cutting off the diodes 118 and 120. The diode 106, of course, remains cut off.

When the diodes 118 and 120 cut off, the junction point 108 is effectively disconnected from the capacitor 24, and the flow of current through resistors 170 and 172 and potentiometer 174 to the negative power supply terminal 176 causes a charge to accumulate on the capacitor 24 in a polarity making the electrode 26 positive with respect to the electrode 28. Since the current flow to the terminal 176 is essentially constant, and since the base current to the transistor 122 is negligible, an essentially constant charging current is provided for the capacitor 24. The voltage across the capacitor 24 increases linearly at a rate proportional to $I/C$, where C is the capacitance of the capacitor 24, and I is the capacitor charging current. A linearly increasing, or ramp, output voltage is thus provided at the terminal 22, as illustrated by the portion 302 of waveform 300 of FIG. 3. By varying the potentiometer 174 the charging current I for the capacitor 24 may be varied, thereby affording a control over the slope of the ramp 302. Alternatively, the slope may be varied by varying the capacitance C.

Eventually, the ramp voltage at the output terminal 22 equals and then exceeds the reference voltage $E_{ref}$ at the junction point 190 in the comparator circuit 32 by around 0.5 v., causing the diode 192 to conduct. The ramp voltage then passes through the diode 192 and capacitor 194 to the base electrode of the comparator transistor 196 which is normally biased to a cut-off condition by current flowing through the diode 206 and resistor 202 to the negative terminal 204. At time $t_2$, which occurs shortly after the diode 192 is biased into conduction, the voltage at the base electrode of the transistor 196 has increased sufficiently to render the transistor 196 conductive. The resulting decrease in potential at the collector electrode of the transistor 196 is applied via the lead 88 and the diode 86 to the collector electrode of the transistor 50, as well as to the base electrode of the transistor 52 in the bistable multivibrator 14, to return the multivibrator 14 to its "reset" state in which the transistor 50 is conductive and the transistor 52 is cut off. In order to insure rapid resetting of the multivibrator 14 regardless of the slope of the ramp voltage being generated, as the transistor 52 begins to cut off the increasing potential at its collector electrode is fed back via the capacitor 208 and the lead 36 to the base electrode of the comparator transistor 196 to rapidly drive the transistor 196 to saturation and thereby rapidly drive the multivibrator transistor 52 to cut off.

As the transistor 52 cuts off, the voltage on the lead 90 returns to a relatively high level, thereby terminating the control signal for the ramp control switch 16. The switching transistor 92 is thus biased to a saturated conductive condition with the emitter electrode of the transistor 92 assuming a potential of around 0.2 v. less than the voltage at the output terminal 22. The series diodes 112 and 110 become cut off, while the diodes 106 and 120 are rendered conductive, thereby terminating the charging of the capacitor 24 and the linearly increasing output voltage 302. A relatively high current carrying discharge path is provided from capacitor electrode 26 through the collector-emitter path of switching transistor 92 and through the diodes 106 and 120 to the capacitor electrode 28 for rapidly discharging the capacitor 24 to afford a rapid ramp termination voltage, illustrated by the portion 304 of the waveform 300 of FIG. 3, at the output terminal 22. Although an additional discharge path exists from the positive terminal 116 through resistor 114 and diode 120 to the capacitor electrode 28, the current flow through the resistor 114 is much smaller than that through the diode 106, and thus the discharge path through the resistor 114 is insignificant as long as the diode 106 is conductive.

However, at time $t_3$ when the voltage at the capacitor electrode 26 has decreased to below around 1.2 v. (the combined forward voltage drops across the diodes 106 and 120 and saturated collector-emitter voltage across the transistor 92), the diode 106 becomes cut off, and the only remaining path for discharge current for the capacitor 24 is through the resistor 114 and the diode 120. As was pointed out above, the switch 16 is designed so that the magnitude of the current through resistor 114 is essentially twice that of the current through resistors 170 and 172 and potentiometer 174. Thus, although a charging current component still flows from the capacitor electrode 28 through resistor 170, a discharging current component essentially twice as large flows onto the capacitor electrode 28 from the resistor 114. The net effect is for current to now flow to the capacitor electrode 28 at the same rate at which current flowed away from the electrode 28 during the formation of the waveform portion 302. Thus, commencing at time $t_3$, the voltage at the output terminal 22 decreases essentially linearly along a portion 306 of the waveform 300 of FIG. 3 at a rate approximately equal to the rate at which the voltage had increased along the waveform portion 302.

After a further decrease in voltage at the output terminal 22, the diode 118 commences to conduct at time $t_4$. Current flow through the diode 118 then gradually increases, along with a corresponding decrease in current flow through the diode 120, until the diodes 118 and 120 conduct essentially equal currents, at which time the circuit reaches its aforementioned balanced condition in which the base-emitter voltage drops of the differential amplifier transistors 122, 124, 126 and 128 and the forward voltage drops across the diodes 118 and 120 add to essentially zero volts, thereby returning the output voltage at the terminal 22 to its baseline condition of zero volts. This condition remains until the next trigger pulse is applied to the input terminal 10 at time $t_1$, causing a repetition of the aforedescribed sequence.

In view of the differential nature of the integration amplifier 18 and the large ratio of capacitor charging current to the amplifier's quiescent input current, the effect of temperature induced transistor $\beta$ and $I_{co}$ changes on ramp slope and on baseline level is minimized. In fact, the circuit of the present invention is able to retain a baseline level to within a few millivolts of zero over a temperature range of from $-55°$ C. to $+100°$ C. In addition, the circuit of the present invention provides a ramp output voltage of exceptional linearity. In tests which have been conducted the maximum measured error in the ramp voltage due to nonlinearity (defined as the maximum positive or negative departure of the ramp voltage from a straight line expressed as a percentage of the maximum ramp voltage) was only 0.025%.

It should be apparent that many modifications and variations may be made for the circuit heretofore shown and described. For example, although the illustrated circuit functions to generate a positive going ramp waveform, a negative ramp generator may be readily afforded simply by reversing the polarities of the bias potentials and the diodes from those shown and employing PNP transistors instead of NPN transistors. Thus, although the present invention has been shown and described with respect to a particular embodiment, various changes and modifications which are obvious to a person skilled in the art to which the invention pertains are deemed to lie within the spirit, scope and contemplation of the invention as set forth in the appended claims.

What is claimed is:

1. A ramp generator comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

switching means coupled to said first and said second electrodes of said capacitor for maintaining an essentially constant charge on said capacitor in the absence of a control signal, and in response to a control signal for allowing said current supply means to charge said capacitor linearly at a predetermined rate whereby a ramp voltage is provided at the output terminal of said signal processing means, and upon termination of said control signal for discharging said capacitor at a rate substantially faster than said predetermined rate whereby said ramp voltage is terminated; and means for generating said control signal and applying it to said switching means.

2. A ramp generator comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

switching means coupled to said first and said second electrodes of said capacitor for maintaining an essentially constant charge on said capacitor in the absence of a control signal whereby the voltage at the output terminal of said signal processing means is maintained essentially at a preselected level, and in response to a control signal for allowing said current supply means to charge said capacitor linearly at a predetermined rate whereby a ramp voltage is provided at the output terminal of said signal processing means, and upon termination of said control signal for first discharging said capacitor at a rate substantially faster than said predetermined rate whereby the voltage at the output terminal of said signal processing means is rapidly changed in the direction of said preselected level, and subsequently discharging said capacitor at a rate essentially the same as said predetermined rate whereby the voltage at the output terminal of said signal processing means is returned to said preselected level; and means for generating said control signal and applying it to said switching means.

3. A ramp generator comprising:

differential amplifying transistor means having a high A.C. voltage gain and high A.C. and D.C. current gains and having an input terminal and an output terminal;

emitter follower transistor means having a base electrode coupled to the output terminal of said differential amplifying means;

a capacitor having a first electrode coupled to the input terminal of said differential amplifying means and having a second electrode coupled to the emitter electrode of said emitter follower means;

current supply means coupled to said first electrode of said capacitor for providing an essentially constant current;

switching means coupled to said first and said second electrodes of said capacitor for maintaining an essentially constant charge on said capacitor in the absence of a control signal, and in response to a control signal for allowing said current supply means to charge said capacitor linearly at a predetermined rate whereby a ramp voltage is provided at said emitter electrode, and upon termination of said control signal for discharging said capacitor at a rate substantially faster than said predetermined rate whereby said ramp voltage is terminated; and means for generating said control signal and applying it to said switching means.

4. A ramp generator comprising:

a differential amplifier including: first, second, third and fourth transistors each having an emitter electrode, a base electrode and a collector electrode; the emitter electrodes of said first and second transistors being coupled together; the emitter electrode of said third transistor being coupled to the base electrode of said first transistor; the emitter electrode of said fourth transistor being coupled to the base electrode of said second transistor; and first bias means coupled to the collector and emitter electrodes of said first, second, third and fourth transistors and to the base electrode of said fourth transistor;

an emitter follower transistor having a base electrode coupled to the collector electrode of said first transistor and having a collector electrode coupled to the emitter electrodes of said first and second transistors, second bias means having one terminal coupled to the collector electrode of said emitter follower transistor, a resistor coupled between the emitter electrode of said emitter follower transistor and another terminal of said second bias means;

a capacitor having a first electrode coupled to the base electrode of said third transistor and having a second electrode coupled to the emitter electrode of said emitter follower transistor;

current supply means coupled to said first electrode of said capacitor for providing an essentially constant current;

switching means coupled to said first and said second electrodes of said capacitor for maintaining an essentially constant charge of said capacitor in the absence of a control signal, and in response to a control signal for allowing said current supply means to charge said capacitor linearly at a predetermined rate whereby a ramp voltage is provided at the emitter electrode of said emitter follower transistor, and upon termination of said control signal for discharging said capacitor at a rate substantially faster than said predetermined rate whereby said ramp voltage is terminated; and means for generating said control signal and applying it to said switching means.

5. A ramp generator comprising:

a differential amplifier means having an input terminal and an output terminal;

signal processing means having a voltage gain of essentially unity and having an input terminal and an output terminal; the input terminal of said signal processing means being coupled to the output terminal of said differential amplifier means;

a capacitor having a first electrode coupled to the input terminal of said differential amplifier means and having a second electrode coupled to the output terminal of said signal processing means;

first current supply means coupled to said first electrode of said capacitor for providing an essentially constant current;

means for controlling the charging and discharging of said capacitor and including: second current supply means, a first unidirectionally conductive device coupled between said second current supply means and said first electrode of said capacitor; a second unidirectionally conductive device coupled between said second current supply means and said second electrode of said capacitor; and means coupled between said second electrode of said capacitor and said second current supply means for maintaining said first and second unidirectionally conductive devices conductive in the absence of a control signal whereby the charge on said capacitor is maintained essentially constant, and in response to a control signal for rendering said first and second unidirectionally conductive devices nonconductive whereby said first current supply means charges said capacitor linearly at a predetermined rate, and in response to the termination of said control signal for providing in conjunction with said first unidirectionally conductive device a unidirectional current flow path between said second and first electrodes of said capacitor for discharging said capacitor at a rate substantially faster than said predetermined rate; and means for generating said control signal and applying it to said switching means.

6. A ramp generator comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

first current supply means coupled to said first electrode of said capacitor for providing an essentially constant current; and means for controlling the charging and discharging of said capacitor and including: second current supply means having a first terminal and a second terminal; a first switching device coupled between said first terminal of said second current supply means and said first electrode of said capacitor; a second switching device coupled between said first terminal of said second current supply means and said second electrode of said capacitor; a third switching device having a control electrode and having a current path coupled between said second electrode of said capacitor and said second terminal of said second current supply means; fourth and fifth switching devices coupled in parallel and in opposite polarity between said first and second terminals of said second current supply means; and means coupled to said control electrode for normally biasing said third switching device to a conductive condition to render said first and second switching devices conductive and said fourth and fifth switching devices nonconductive whereby the charge on said capacitor is maintained essentially constant, and for applying a control signal to said control electrode to render said third switching device and said first and second switching devices nonconductive while rendering said fourth switching device conductive whereby said first current supply means charges said capacitor linearly at a predetermined rate, and upon the termination of said control signal for biasing said third switching device to a conductive condition to render said fourth switching device nonconductive and said first and fifth switching devices conductive whereby said capacitor discharges at a rate substantially faster than said predetermined rate, and after a short interval of time to render said fifth switching device nonconductive whereby said capacitor discharges at a rate essentially the same as said predetermined rate, and subsequently to render said second switching device conductive.

7. A ramp generator comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

first and second diodes respectively coupled in like polarity between a common junction point and said first and second electrodes of said capacitor; a transistor having a first electrode, a second electrode and a base electrode; said first electrode of said transistor being coupled to said second electrode of said capacitor; a third diode coupled between said second electrode of said transistor and said junction point in a polarity such that a unidirectional current flow path is provided between said first and second electrodes of said capacitor through said transistor and said third and first diodes; fourth and fifth diodes coupled in series between said second electrode of said transistor and said junction point in opposite polarity to that of said third diode, means for supplying current to said junction point; and means for applying a control signal to said base electrode.

8. A ramp generator comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

first and second diodes having their anodes coupled to a common junction point and having their cathodes respectively coupled to said first and second electrodes of said capacitor; an NPN transistor having an emitter electrode, a collector electrode, and a base electrode; said collector electrode being coupled to said second electrode of said capacitor; a third diode having its anode coupled to said emitter electrode and its cathode coupled to said junction point; fourth and fifth diodes coupled in series between said emitter electrode and said junction point with the cathode of said fourth diode coupled to said emitter electrode and the anode of said fifth diode coupled to said junction point; means for supplying current to said junction point; and means for applying a control signal to said base electrode.

9. A circuit for generating a ramp voltage in response to a trigger signal comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

switching means coupled to said first and said second electrodes of said capacitor for maintaining an essentially constant charge on said capacitor in the absence of a control signal, and in response to a control signal for allowing said current supply means to charge said capacitor linearly at a predetermined rate whereby a ramp voltage is provided at the output terminal of said signal processing means, and upon termination of said control signal for discharging said capacitor at a rate substantially faster than said predetermined rate whereby said ramp voltage is terminated;

a bistable multivibrator coupled to said switching means for providing said control signal in response to said trigger signal and for terminating said control signal in response to a reset signal;

means for applying said trigger signal to said bistable multivibrator; and comparator means coupled between said output terminal of said signal processing means and said bistable multivibrator for comparing said ramp voltage with a reference voltage of predetermined magnitude and for generating said reset signal when said ramp voltage exceeds said reference voltage.

10. A circuit for generating a ramp voltage in response to a trigger signal comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

switching means coupled to said first and said second electrodes of said capacitor for maintaining an essentially constant charge on said capacitor in the absence of a control signal, and in response to a control signal for allowing said current supply means to charge said capacitor linearly at a predetermined rate whereby a ramp voltage is provided at the output terminal of said signal processing means, and upon termination of said control signal for discharging said capacitor at a rate substantially faster than said predetermined rate whereby said ramp voltage is terminated;

a bistable multivibrator for providing said control signal in response to said trigger signal and for terminating said control signal in response to a reset signal, said bistable multivibrator having an output terminal coupled to said switching means and having a trigger terminal and a reset terminal;

means for applying said trigger signal to the trigger terminal of said bistable multivibrator;

comparator means coupled between the output terminal of said signal processing means and the reset terminal of said bistable multivibrator for comparing said ramp voltage with a reference voltage of a predetermined magnitude and for generating said reset signal when said ramp voltage exceeds said reference voltage; and feedback means coupled between the output terminal of said bistable multivibrator and said comparator means for accelerating the generation of said reset signal upon the commencement of the termination of said control signal.

11. A circuit for generating a ramp voltage in response to a trigger signal comprising:

differential amplifier means having an input terminal and an output terminal;

signal processing means having a voltage gain of essentially unity and having an input terminal and an output terminal, the input terminal of said signal processing means being coupled to the output terminal of said differential amplifier means;

a capacitor having a first electrode coupled to the input terminal of said differential amplifier means and having a second electrode coupled to the output terminal of said signal processing means;

current supply means coupled to said first electrode of said capacitor for providing an essentially constant current;

switching means coupled to said first and said second electrodes of said capacitor for maintaining an essentially constant charge on said capacitor in the absence of a control signal and in response to a control signal for allowing said current supply means to charge said capacitor linearly at a predetermined rate whereby a ramp voltage is provided at the output terminal of said signal processing means, and upon termination of said control signal for discharging said capacitor at a rate substantially faster than said predetermined rate whereby said ramp voltage is terminated;

a bistable multivibrator for providing said control signal in response to said trigger signal and for terminating said control signal in response to a reset signal, said bistable multivibrator having an output terminal coupled to said switching means and having a trigger terminal and a reset terminal;

means for applying said trigger signal to the trigger terminal of said bistable multivibrator;

a comparator circuit including: a transistor having an emitter electrode, a base electrode, and a collector electrode; means coupled between said emitter and base electrodes for normally biasing said transistor to a non-conductive state; and means coupled to said base electrode for comparing said ramp voltage with a reference voltage of predetermined magnitude and for biasing said transistor to a conductive state when said ramp voltage exceeds said reference voltage; and means coupled between said collector electrode and the reset terminal of said bistable multivibrator for applying said reset signal to said multivibrator when said transistor is rendered conductive; and a regenerative feedback path coupled between the output terminal of said bistable multivibrator and said base electrode for biasing said transistor to a state of greater conduction upon the commencement of the termination of said control signal whereby a rapid termination of said control signal is achieved.

12. A ramp generator comprising:

a differential amplifier including: first, second, third and fourth transistors each having an emitter electrode, a base electrode and a collector electrode; the emitter electrodes of said first and second transistors being coupled together; the emitter electrode of said third transistor being coupled to the base electrode of said first transistor; the emitter electrode of said fourth transistor being coupled to the base electrode of said second transistor; and first bias means coupled to the collector and emitter electrodes of said first, second, third and fourth transistors and to the base electrode of said fourth transistor;

an emitter follower transistor having a base electrode coupled to the collector electrode of said first transistor and having a collector electrode coupled to the emitter electrodes of said first and second transistors, second bias means having one terminal coupled to the collector electrode of said emitter follower transistor, a resistor coupled between the emitter electrode of said emitter follower transistor and another terminal of said second bias means;

a capacitor having a first electrode coupled to the base electrode of said third transistor and having a second electrode coupled to the emitter electrode of said emitter follower transistor;

first means for providing an electrical potential, resistive means coupled between said first potential providing means and said first electrode of said capacitor;

first and second diodes respectively coupled in like polarity between a common junction point and said first and second electrodes of said capacitor; a switching transistor having a first electrode, a second electrode and a base electrode; said first electrode of said switching transistor being coupled to said second electrode of said capacitor; a third diode coupled between said second electrode of said switching transistor and said junction point in a polarity such that a unidirectional current flow path is provided between said first and second electrodes of said capacitor through said switching transistor and said third and first diodes; fourth and fifth diodes coupled in series between said second electrode of said switching transistor and said junction point in opposite polarity to that of said third diode; second means for providing an electrical potential different from the potential provided by said first potential providing means, resistive means coupled between said second potential providing means and said junction point, third bias means resistively coupled to said second electrode of said switching transistor; and means for applying a control signal to the base electrode of said switching transistor.

No references cited.

ARTHUR GAUSS, *Primary Examiner.*

B. P. DAVIS, *Assistant Examiner.*